(12) United States Patent
Maslow et al.

(10) Patent No.: US 8,597,734 B2
(45) Date of Patent: Dec. 3, 2013

(54) CURING SYSTEM AND COATINGS OBTAINED THEREOF

(76) Inventors: Wasil Maslow, Deventer (NL); Flip T. Breuker, Rijssen (NL); Auke G. Talma, Bathmen (NL); Andreas P. Van Swieten, Velp (NL)

( * ) Notice: Subject to any disclaimer, the term of this patent is extended or adjusted under 35 U.S.C. 154(b) by 686 days.

(21) Appl. No.: 12/808,562

(22) PCT Filed: Dec. 11, 2008

(86) PCT No.: PCT/EP2008/067329
§ 371 (c)(1),
(2), (4) Date: Sep. 10, 2010

(87) PCT Pub. No.: WO2009/077420
PCT Pub. Date: Jun. 25, 2009

(65) Prior Publication Data
US 2011/0014383 A1    Jan. 20, 2011

(30) Foreign Application Priority Data
Dec. 17, 2007 (EP) .................................. 07123364
Jan. 24, 2008 (EP) .................................. 08100896

(51) Int. Cl.
*B05D 3/02* (2006.01)

(52) U.S. Cl.
USPC .......................... 427/386; 528/367; 524/612

(58) Field of Classification Search
None
See application file for complete search history.

(56) References Cited

U.S. PATENT DOCUMENTS

| | | | |
|---|---|---|---|
| 4,283,521 A | 8/1981 | Jones | |
| 4,837,295 A | 6/1989 | Drain | |
| 5,075,410 A | 12/1991 | Arpin | |
| 5,459,204 A * | 10/1995 | Lomoelder et al. | 525/409 |
| 5,932,637 A | 8/1999 | Ito et al. | |

FOREIGN PATENT DOCUMENTS

| | | |
|---|---|---|
| EP | 0 077 840 | 5/1983 |
| WO | WO 89/08122 | 9/1989 |
| WO | WO 2007/134948 | 11/2007 |

OTHER PUBLICATIONS

Database WPI Week 199640, Thomson Scientific, London, Great Britain, AN 1989-259001 "XP-002487877" & JP 02 531724 B2 (Sanko Kaihatsu Kagaku Kenkyusho) Sep. 4, 1996 Abstract, Table 2.
International Search Report and Written Opinion of PCT/EP2008/067329, Jun. 2009.

* cited by examiner

Primary Examiner — Erma Cameron
(74) Attorney, Agent, or Firm — Brinks, Gilson & Lione

(57) ABSTRACT

A peroxide-free curing system comprising 20-89.5% by weight of a compound having at least one epoxide group, 0.5-30% by weight of a polyamine, and 10-50% by weight of a co-curing agent is presented. The co-curing agent has formula (I):

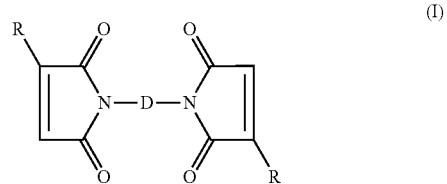

and/or its tautomeric formulae IIa and/or IIb:

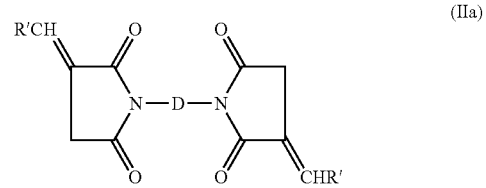

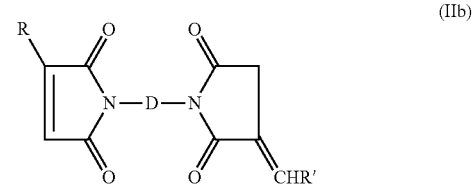

and/or formula (III):

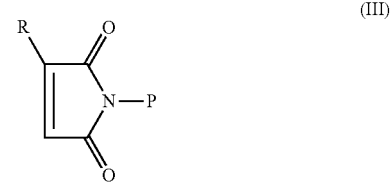

or a tautomer and/or an oligomer thereof; wherein D stands for branched $(CR_1R_2)_n$ or

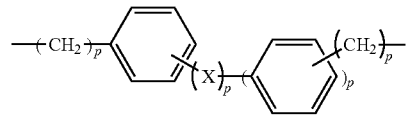

wherein p is independently 0 or 1, and X is $CH_2$, O, or $SO_2$ and

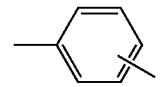

stands for a meta- or para-benzene group; R is independently H or C1-C4 alkyl; $R_1$ and $R_2$ are independently H or $(CH_2)_m CH_3$; wherein at least one group $R_2$ is $(CH_2)_m CH_3$ and m being 0 to 2; n being 1 to 10; and n+m is 4 to 14; R'—$CH_2$ is R; and P stands for phenyl, or unsubstituted or hydroxy-substituted $C_{1-6}$ alkyl or $C_{2-6}$ alkenyl; with the proviso that at least one of R is $C_{1-4}$ alkyl.

18 Claims, No Drawings

CURING SYSTEM AND COATINGS OBTAINED THEREOF

CROSS REFERENCE TO RELATED APPLICATIONS

This application claims priority to PCT/EP2008/067329 filed Dec. 11, 2008; EP 08100896.3 filed Jan. 24, 2008; and EP 07123364.7 filed Dec. 17, 2007.

TECHNICAL FIELD

The disclosure pertains to a curing system comprising a compound having at least one epoxide group, a polyamine, and a co-curing agent. The disclosure also relates to a method for curing the system and to a coating obtained thereof.

BACKGROUND

Coating compositions based on compounds with epoxy groups have a limited temperature resistance, and decomposition occurs above 160° C.

In U.S. Pat. No. 5,198,515, a process was described for modifying resins having olefinically unsaturated bonds by combining with bismaleimides. According to this method polymers having a heat resistance up to 500° C. can be obtained using 1,3-bis(citraconimidomethyl)benzene. This product is available under the trade names Flexlink® and Perkalink®.

Flexlink® has the chemical formula shown below, wherein D stands for 1,3-dimethylenebenzene and R is a methyl group:

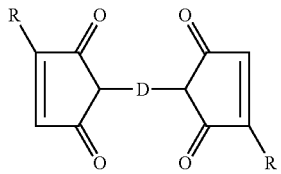

The crosslink accelerator of this curing system is peroxide. However, for polymers having an epoxide group that are not cured in the presence of peroxide but in the presence of an amine-functional compound, only low amounts of Flexlink® can be used. The Flexlink® content in such curing system is below about 20%, due to its limited solubility. At higher concentrations Flexlink® forms sediment in the curing system.

In U.S. Pat. No. 4,837,295, epoxy resin adhesives have been disclosed in which polyoxyalkylene polyamines are used as curing agents and mono- or bis-unsaturated maleimides are present, but N,N'-hexamethylenedicitraconimide, for which no protection is sought, is also described. The maleimides of U.S. Pat. No. 4,837,295, however, are toxic and carcinogenic compounds, and moreover have different reactivity in comparison with the biscitranonimides of this disclosure. A further disadvantage of these compounds is that they cannot be used in low temperature applications because they are not soluble and solidify in the curing systems at room temperature.

The synthesis of biscitraconimide compounds having both ether and sulfone groups is disclosed in JP 01-186865, such as 4,4'-bis(3-citraconimidophenoxy)diphenyl sulfone. Such compounds are not used in the present disclosure.

There is a need for peroxide-free curing systems having much higher amounts of bismaleimides than possible with Flexlink®. It is therefore an objective of the invention to provide such systems which are less toxic and carcinogenic than the known systems.

SUMMARY

It is an object of this disclosure to provide a peroxide-free curing system comprising a compound having at least one epoxide group, a polyamine, and a co-curing agent. The epoxide containing compound may make up 20-89.5% of the curing system by weight, while the weight percentages associated with the polyamine and the co-curing agent may range from 0.5-30% and 10-50%, respectively. The co-curing agent has the structure provided in formula (I), (IIa), (IIb), and/or (III) shown below.

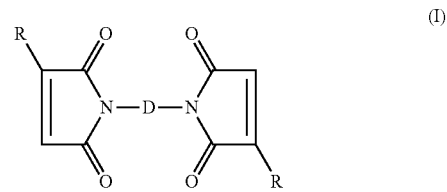
(I)

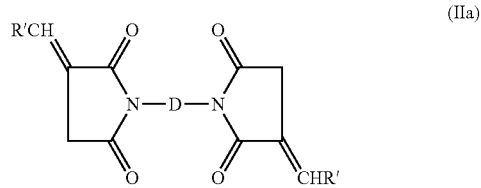
(IIa)

(IIb)

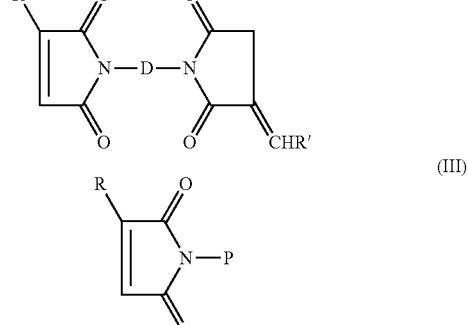
(III)

In each of the preceding structures, D stands for a branched $(CR_1R_2)_n$ or

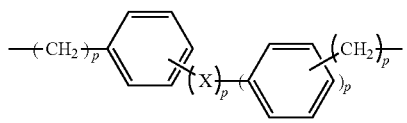

where p is independently 0 or 1, and X is $CH_2$, O, or $SO_2$ and

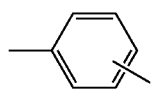

stands for a meta- or para-benzene group; R is independently H or C1-C4 alkyl; $R_1$ and $R_2$ are independently H or $(CH_2)_m CH_3$; wherein at least one group $R_2$ is $(CH_2)_m CH_3$ and m being 0 to 2; n being 1 to 10; and n+m is 4 to 14; R'—$CH_2$ is R; and P stands for phenyl, or unsubstituted or hydroxy-substituted $C_{1-6}$ alkyl or $C_{2-6}$ alkenyl; with the proviso that at least one of R is $C_{1-4}$ alkyl.

Another aspect of the present disclosure pertains to a method for obtaining a cured polymer by heating the curing system, to a temperature and a time sufficient to co-cure the co-curing agent, the polyamine, and the epoxide group-containing compound.

Further areas of applicability will become apparent from the description provided herein. It should be understood that the description and specific examples are intended for purposes of illustration only and are not intended to limit the scope of the present disclosure.

DETAILED DESCRIPTION

The following description is merely exemplary in nature and is in no way intended to limit the present disclosure or its application or uses. It should be understood that throughout the description and drawings, corresponding reference numerals and letters indicate like or corresponding elements and features.

This disclosure generally relates to a peroxide-free curing system comprising 20-89.5% by weight of a compound having at least one epoxide group, 0.5-30% by weight of a polyamine, and 10-50% by weight of a co-curing agent. The co-curing agent may have the structure depicted in formula I, its tautomeric formulae shown in IIa and/or IIb, and/or the structure shown in formula III, a tautomer thereof, and/or an oligomer thereof:

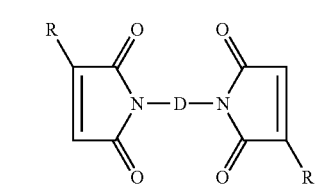
(I)

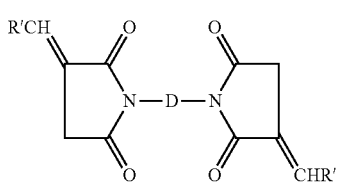
(IIa)

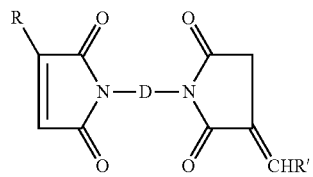
(IIb)

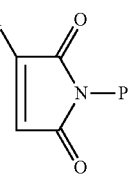
(III)

In the preceding formulae, D stands for branched $(CR_1R_2)_n$ or

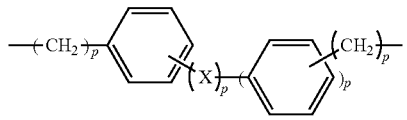

wherein p is independently 0 or 1, and X is $CH_2$, O, or $SO_2$ and

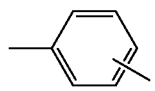

stands for a meta- or para-benzene group; R is independently H or C1-C4 alkyl; $R_1$ and $R_2$ are independently H or $(CH_2)_m CH_3$; wherein at least one group $R_2$ is $(CH_2)_m CH_3$ and m being 0 to 2; n being 1 to 10; and n+m is 4 to 14; R'—$CH_2$ is R; and P stands for phenyl, or unsubstituted or hydroxy-substituted $C_{1-6}$ alkyl or $C_{2-6}$ alkenyl; with the proviso that at least one of R is $C_{1-4}$ alkyl.

Examples of D include, but are not limited to the structures shown in IV(a)-IV(j) below:

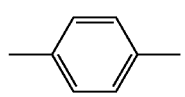
IV(a)

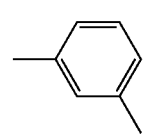
IV(b)

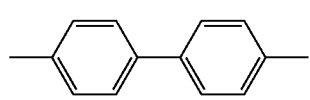
IV(c)

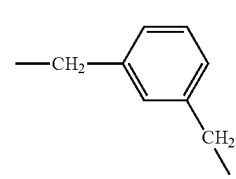
IV(d)

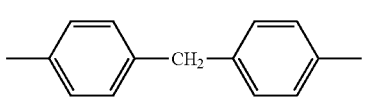
IV(e)

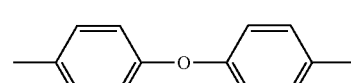
IV(f)

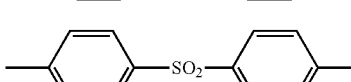
IV(g)

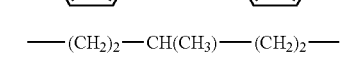
IV(h)

—$(CH_2)_2$—$CH(CH_3)$—$(CH_2)_2$—  IV(h)

—$(CH_2)_4$—$CH(CH_3)$—$(CH_2)_4$—  IV(i)

—$CH_2$—$CH(CH_3)$—$CH_2$—$CH(CH_3)$—$CH_2$—  IV(j)

The co-curing agent is a citraconimide, and one or both maleimide moieties may be in their tautomeric itaconimide form. These citraconimides (and their tautomers) can occur as depicted, but can also readily form a dimer, trimer, or higher oligomer. Where the co-curing agent citraconimide is mentioned, also its tautomers and oligomers formed from 2 up to 10 molecules of formulae (I), (IIa), (IIb) and/or (III) are included. The amounts by weight are based on the weight of the peroxide-free curing system.

Another aspect of the present disclosure pertains to a method for obtaining a cured polymer by heating the curing system, to a temperature and a time sufficient to co-cure the co-curing agent and the epoxide group-containing compound. In this system the polyamine may act as cross-linking agent as well as curing catalyst, and optionally other ingredients are added to the system. Such other ingredients may be monoamines that do not react as cross-linking agent, but still can be effective curing catalysts or co-catalysts.

The curing system may contain other ingredients such as nanoparticles, for instance carbon nanotubes or modified hydrotalcite, among others; adhesion improvers, which are known compounds or compositions that improve the adhesion of the coating to a surface such as silane coupling agents, titanium coupling agents, zirconia coupling agents, aluminum coupling agents, organopolysiloxane compositions, or those described in U.S. Pat. No. 4,389,432; and other additives such as dyes, pigments, and the like.

It may also be useful to use mixtures of biscitraconimide and/or bisitaconimde (I, IIa, IIb) and monomeric maleimide or itaconimide (III). Mixtures of such monomers and dimers, for instance 1 to 20% monomer (III) by weight of the co-curing agent of the curing system, lead to cured polymers having a more flexible network. Higher amounts, up to 100% lead to very flexible to extreme flexible networks. In addition also maleimide can be used to replace part of (I), (IIa), (IIb), and/or (III). This further increases the thermal resistance of the coating and also gives unique curing possibilities, e.g. quick fixation at room temperature (predominantly citraconimide curing), optionally followed by post-hardening at elevated temperature (predominantly maleimide curing).

The curing is carried out by simply mixing a system containing at least one biscitraconimide of the formula (I), where required as a mixture with formula (IIa) and/or (IIb), or (III), or a tautomer or oligomer thereof, an epoxide, polyamine, and optionally other ingredients such as monoamine, nanoparticles, and the like, optionally heating to a temperature sufficient to co-cure the (bis)citraconimide and the epoxide-containing compound and maintaining the temperature at that level for a sufficient time to cure the material into a polymeric product. Such temperature and time can easily be determined by the skilled person using routine procedures. Curing can be accomplished at 20° C. to 150° C. Generally, the curing will be accomplished at a temperature below 130° C., preferably at room temperature. The curing time will vary depending on the amount of polyamine and type of material present, and can easily be determined by standard analytical techniques.

According to another aspect of the present disclosure, additional nitrogen-containing curing catalysts for maleimide systems may be employed, such as amine-containing catalysts, among others.

Although the system comprises a compound containing at least one epoxide group, one skilled-in-the-art will understand that compounds having one or more epoxide groups in combination with an olefinically unsaturated, isocyanate, or urethane group can also be used without exceeding the scope of the disclosure.

Examples of co-curing agents are known from U.S. Pat. No. 5,198,515, but none of these generically mentioned compounds are disclosed in the patent to be suitable in the peroxide-free epoxy-containing compound curing systems of this disclosure.

Flexlink® has the chemical name 1,3-bis(citraconimidomethyl)benzene and is available from Flexsys, Brussels, Belgium. Lowering the melting point of Flexlink® by isomerization (tautomerization) provides a modified Flexlink® and improves the solubility of this product in a stable formulation for room temperature curing applications. Instead of less than 10-20% of Flexlink® more than 25% of this modified Flexlink® can dissolve in epoxy-modified 2K (two component) curing systems at room temperature without forming sediment on storage. A solvent-free room temperature compatible stable 2K system is then obtained. This means that it is a prerequisite for obtaining higher concentrations of Flexlink® in a stable formulation to tautomerize Flexlink®. Optionally, also an appropriate reactive or non-reactive solvent can be added.

A particularly suitable biscitraconimide has formula (I) wherein D is a branched $C_6$-alkylene group, which is liquid at room temperature. For this reason this molecule can even be used as such without isomerization in very high concentrations (>50%). Isomerization will further increase the solubility. These aliphatic citraconimides give clear coatings and are color stable and resistant to outdoor conditions like UV. To obtain clear coatings from commercial Flexlink® the standard available grade has to be recrystallized.

Tautomerized Flexlink® in combination with compounds having reactive epoxides, glycidyl ethers, and glycidyl esters such as Epikote 827/828 and Epikote 1001 (available from Hexion Specialty Chemicals, Columbus, Ohio, USA) or Thioplast® EPS (manufacturer Akzo Nobel, the Netherlands) can be used.

Conventional commercially available 2K systems based on epoxy resins can be heated to at most 160° C. At higher temperature these curing systems decompose. Addition of modified Flexlink® into such formulations improves the heat resistance and stability. With modified citraconimide formulations high temperature resistance up to 250° C. can be obtained, while curing can be done at room temperature. The melting point of the modified (tautomerized) citraconimide Flexlink® (having a citraconimide:itaconimide ratio of approximately 45:55) is about 60-70° C. Unmodified citraconimide which is commercially available as Flexlink® (having a citraconimide:itaconimide ratio of approximately 95:5) has a melting point of about 90° C. Preferably the citraconimide contains 6 to 50% of one or two of the tautomeric itacon isomers.

Apart from improved heat resistance the coating obtained from the curing system of the present disclosure also shows improved chemical and scratch resistance and auto repairing properties.

The curing system also contains a polyamine. These act as accelerators and/or as co-monomer. Suitable polyamines are compounds having at least two primary and/or secondary amino groups, as well as mixtures of such polyamines. Also amine-containing oligomers and polymers can be used, such as commercially available Aradur® (ex. Huntsman, Salt Lake City, USA), and other nitrogen-containing basic molecules. The curing systems of the present invention allow high concentration of co-curing agent, which should be at least 10% of the composition, but can easily be up to 50%. Further description of polyamines are provided in the various Examples described herein.

The citraconimides of the invention give clear coatings and are color stable and resistant to outdoor conditions like ultraviolet radiation (UV). Addition of the co-curing agents in high concentration leads to improving the heat resistance and stability, whereas this improvement increases with higher amounts of co-curing agent in the system.

On adding nano-particles such as modified hydrotalcite, auto-topographic 3D landscape formation was observed on various substrates. This can be attractive for decorative applications. Also scratch resistance and anti-slip was improved. The layer thickness of the coating is variable within 50 micron up to several millimeters. The thicker the layer the more pronounced the esthetic effect obtained.

The compositions of the present disclosure can be applied onto a variety of surfaces, among which soft and hard wood, artificial wood, such as multiplex and the like, glass, aluminum, stainless steel, iron, plastics like PVC, polycarbonate, polyesters, polyamides, polyethylene and polypropylene, concrete, stone, latex surfaces, conventional paint surface, natural and synthetic fibers like aliphatic and aromatic polyamide, polyester, cotton, and the like.

Applications for use of the novel coating compositions of the present disclosure include, but are not limited to clear coatings, adhesives, sealants, fillers, and combinations thereof.

The invention will be further described with reference to the following examples which are not to be construed as limiting the scope of the invention.

Example 1

General Method for Modifying Flexlink®

Commercially available Flexlink® (ex Flexsys, Belgium) was mixed with a weak base N-phenyl imidazole (or any other weak base) used as a catalyst (concentration range of 0.05-5% m/m), preferably with 0.1-3.0% m/m, and most preferably with 0.5-1.0% m/m, heated in an oven for approximately 10-20 hours at approximately 130° C. or 3-4 hours at 140° C. The higher the temperatures higher amounts of oligomerized homo (pre)polymer were formed.

As curing agent various types of amines can be used. For very fast curing times small amines like ethylenediamine (EDA), diethylenetriamine (DETA), triethylene-tetramine (TETA), tetraethylenepentamine (TEPA), pentamethylenehexamine (PEHA), and the like, and functionally similar homologues or derivatives can be used.

Example 2

Fast Curing System 2K System

Mixture 1: A total of 15 grams of tautomerized Flexlink® was melted in an oven (70-90° C.) and mixed with 15 grams of an epoxy curing agent (Epikote 827/828 or 1001) and homogenized. An optional amount of 0.5 to 3 grams of a coupling agent such as trialkoxy glycidyl silane was added to this mixture for improving adhesion on metal surfaces.

Mixture 2: In another cup, 15 grams of TEPA were prepared.

Both mixtures 1 and 2 were mixed with each other. An exothermic reaction occurred (>100° C.). During this heating period also a certain amount of Flexlink® was tautomerized. Within several minutes this coating system can be applied as a thin layer coating, a filler, a liner, or as adhesive onto a surface like wood, metal or the like. These 2K systems can also be sprayed and mixed in a nozzle for professional applications.

If more elasticity is required in the final curing system, 2-5 grams of Thioplast® EPS can be added, and/or less of epoxy can be used (for instance 10-13 grams instead of 15 grams).

If a long operating time is required, for instance hours instead of minutes, more fatty amine derivative (such as a Duomeen® homologue; manufacturer: Akzo Nobel) and less EDA or homologue thereof should be added.

The coupling agent can also be applied separately by first activating the metal surface with caustic soda (by a washing procedure) and thereafter degreasing the surface together in the presence of the coupling agent. In that case the coupling agent is specifically present for adhesion of the metal to the coating.

Example 3

Slow Curing 2K System

Mixture 1: A total of 15 grams of tautomerized Flexlink was melted in an oven (70-90° C.), mixed with 15 grams of an epoxy curing agent (Epikote 827/828 or 1001), and homogenized. An optional amount of 0.5 to 3 grams of a coupling agent was added to this mixture for improved adhesion (such as trialkoxy glycidyl silane) on metal surfaces.

Mixture 2: In another cup, 15 grams of cocopropylenediamine (Duomeen CD), or other Duomeen types (homologues of monosubstituted propylenediamines) were prepared. Both mixtures were mixed with each other. A slight exothermic reaction occurred, whereby the temperature increased to approximately 30-50° C.

The operating time is at least several hours for applying this coating system as a thin layer coating onto a surface like wood, metal, or another material, as filler, liner, or as adhesion. After 10-15 hours drying at room temperature the system was hardened. These 2K systems also can be sprayed and mixed in a nozzle for professional applications.

If more elasticity is required in the final curing system, 2-5 grams of Thioplast EPS can be added, and/or less of epoxy can be used (for instance 10-13 grams instead of 15 grams).

If a shorter operating time is required, for instance half an hour instead of several hours, for instance TETA can be added and less of the Duomeen homologue.

The coupling agent can also be applied separately by first activating the metal surface with caustic soda (by a washing procedure) and thereafter degreasing the surface together in the presence of the coupling agent. In that case, the coupling agent is specifically present for adhesion of the metal to the coating.

If water repelling properties (anti-corrosion and the like) are needed then fatty (poly)amines and derivatives can be used. A variety of amines were tested and good results were obtained with Duomeen®, tri- and linear and branched Tetrameen® (monosubstituted tripropylenetetramines, manufacturer Akzo Nobel)).

By applying combinations of different amines, such as short amines and fatty amines, the curing time is tunable. Jeffamines (polyoxyalkyleneamines), dendrimers and/or polyamino amides may also be used.

Example 4

Nanotechnoloqy Application for a Three Dimensional Auto Topographic Landscape Formation The composition of Example 3 was used as the basic formulation.

In mixture 1 (the imide/epoxy part) additionally 0.1-10% m/m, preferably 0.5-5%, m/m, and most preferably 1-4% m/m modified hydrotalcite F100 were added and thoroughly mixed. A total of 4 grams of HTC F100 was then added to mixture 1. This mixture 1 was aged for at least half an hour to defoliate before mixing with mixture 2. The resulting mixture with an operating time of several hours was coated on metal (aluminum or stainless steel), wood, concrete, or other surface.

On standing (drying) at room temperature for 5-10 hours the auto topographic landscape was automatically formed. After 24 hours a dry three dimensional clear coating was obtained having a crocodile look. Optionally 0.1-1% of a dye or 20-30% of a pigment can be added and used for providing aesthetic colors. The color body is predominantly concentrated on the islands and far less on the streets. This means that also an aesthetic color distribution and separation are obtained.

A person skilled in the art will recognize that all of the measurements described are standard measurements that can be obtained by a variety of different test methods. The test methods described throughout the disclosure represent only one available method capable of obtaining each of the desired measurements.

The foregoing description of various embodiments of the disclosure has been presented for purposes of illustration and description. It is not intended to be exhaustive or to limit the disclosure to the precise embodiments disclosed. Numerous modifications or variations are possible in light of the above teachings. The embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the disclosure as determined by the appended claims when interpreted in accordance with the breadth to which they are fairly, legally, and equitably entitled.

What is claimed is:

1. A peroxide-free curing system; the curing system comprising:
   20-89.5% by weight of a compound having at least one epoxide group,
   0.5-30% by weight of a polyamine, and
   10-50% by weight of a citraconimide co-curing agent,
   wherein the co-curing agent has a formula corresponding to formula (I):

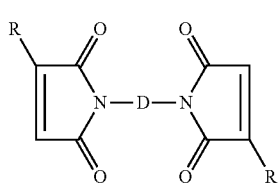

(I)

and/or its tautomeric formulae (IIa) and/or (IIb):

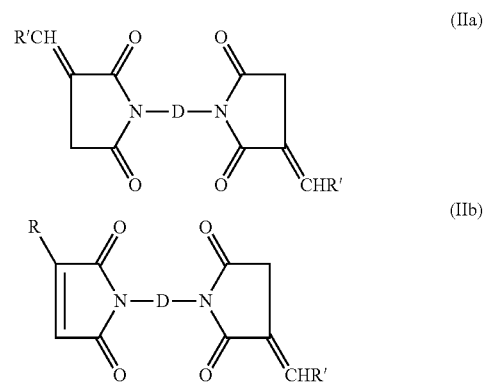

and/or formula (III):

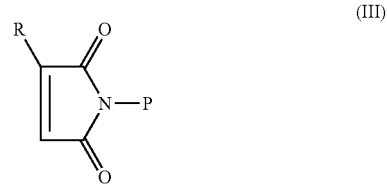

or a tautomer and/or an oligomer thereof;
wherein D stands for branched $(CR_1R_2)_n$ or

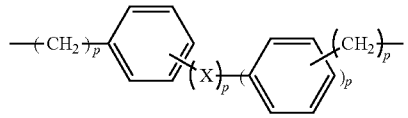

where p is independently 0 or 1, and X is $CH_2$, O, or $SO_2$ and

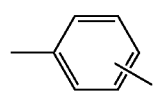

stands for a meta- or para-benzene group; R is independently H or $C_{1-4}$ alkyl; $R_1$ and $R_2$ are independently H or $(CH_2)_m$ $CH_3$; wherein at least one group $R_2$ is $(CH_2)_m CH_3$ and m being 0 to 2; n being 1 to 10; and n+m is 4 to 14; R' coupled to a $CH_2$ group is equal to R; and P stands for phenyl, or unsubstituted or hydroxy-substituted $C_{1-6}$ alkyl or $C_{2-6}$ alkenyl; with the proviso that at least one of R is $C_{1-4}$ alkyl.

2. The curing system of claim 1 wherein R is methyl and R' is H.

3. The curing system of claim 1 wherein 6-50% of the co-curing agent has formulae (IIa) and/or (IIb).

4. The curing system of claim 1 comprising 20-40% by weight of the composition of the co-curing agent.

5. The curing system of claim 1 wherein the co-curing agent has moiety D which stands for a branched C6-alkylene group, or wherein the co-curing agent is 1,3-bis(citraconimidomethyl)benzene.

6. The curing system of claim 1 further comprising nanoparticles and/or an adhesion improver.

7. A coating applied to a surface, the coating comprising a cross-linked polymer resulting from curing the curing system of claim 1 wherein the compound has at least one epoxide group that is cross-linked by the polyamine; and the surface selected as one from the group of soft wood, hard wood, artificial wood, glass, aluminum, stainless steel, iron, plastic, concrete, stone, a painted surface, natural fibers, and synthetic fibers.

8. A method for curing a peroxide-free curing system, the method comprising:

providing a peroxide-free curing system; the curing system including a compound having at least one epoxide group, a polyamine, and a citraconimide co-curing agent, and allowing the curing system to cure at a temperature and for a time sufficient to co-cure the co-curing agent, the compound, and the polyamine;

wherein the co-curing agent has a formula corresponding to formula (I):

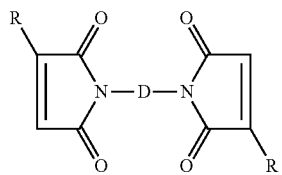

(I)

and/or its tautomeric formulae (IIa) and/or (IIb):

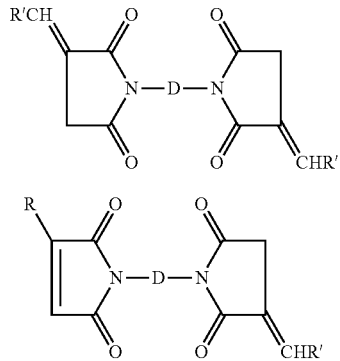

(IIa)

(IIb)

and/or formula (III):

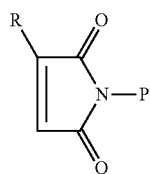

(III)

or a tautomer and/or an oligomer thereof;

wherein D stands for branched $(CR_1R_2)_n$ or

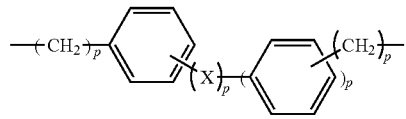

where p is independently 0 or 1, and X is $CH_2$, O, or $SO_2$ and

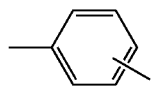

stands for a meta- or para-benzene group; R is independently H or $C_{1-4}$ alkyl; $R_1$ and $R_2$ are independently H or $(CH_2)_m CH_3$; wherein at least one group $R_2$ is $(CH_2)_m CH_3$ and m being 0 to 2; n being 1 to 10; and n+m is 4 to 14; R' coupled to a $CH_2$ group is equal to R; and P stands for phenyl, or unsubstituted or hydroxy-substituted $C_{1-6}$ alkyl or $C_{2-6}$ alkenyl; with the proviso that at least one of R is $C_{1-4}$ alkyl.

9. The method according to claim 8 wherein the curing is performed at a temperature lower than 130° C.

10. The method according to claim 9 wherein the curing is performed at room temperature.

11. The method according to claim 8 wherein the polyamine is both a cross-linking agent and a curing catalyst.

12. The method according to claim 8, wherein the curing system further includes monoamines, the monoamines acting as a curing catalyst.

13. The method according to claim 8, wherein the curing system comprises:
20-89.5% by weight of the compound having at least one epoxide group,
0.5-30% by weight of the polyamine, and
10-50% by weight of the co-curing agent.

14. The curing system according to claim 1, wherein 1-20% of the co-curing agent has the structure of formula (III).

15. A method of curing a coating applied onto a surface, the method comprising:

providing a coating applied onto a surface; the coating including a compound having at least one epoxide group, a polyamine, and a citraconimide co-curing agent;

heating the coating to a predetermined temperature;

holding the coating at the temperature for a predetermined amount of time;

wherein the temperature and time are sufficient to co-cure the co-curing agent, the compound, and the polyamine;

wherein the co-curing agent has a formula corresponding to formula (I):

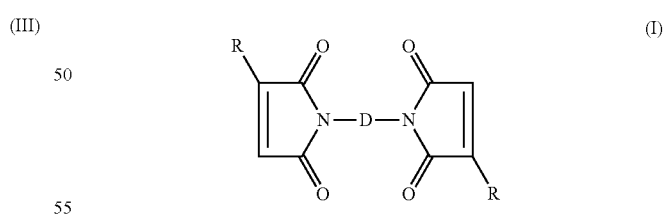

(I)

and/or its tautomeric formulae (IIa) and/or (IIb):

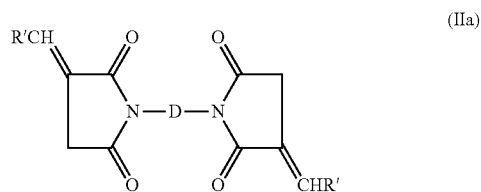

(IIa)

-continued

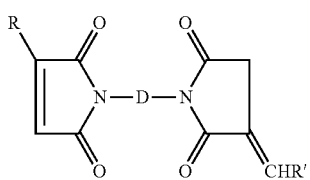

(IIb)

and/or formula (III):

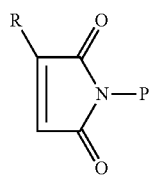

(III)

or a tautomer and/or an oligomer thereof;
wherein D stands for branched $(CR_1R_2)_n$ or

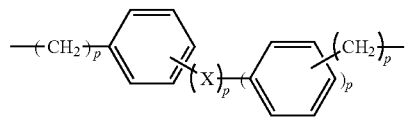

where p is independently 0 or 1, and X is $CH_2$, O, or $SO_2$ and

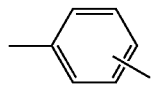

stands for a meta- or para-benzene group; R is independently H or $C_{1-4}$ alkyl; $R_1$ and $R_2$ are independently H or $(CH_2)_m CH_3$; wherein at least one group $R_2$ is $(CH_2)_m CH_3$ and m being 0 to 2; n being 1 to 10; and n+m is 4 to 14; R' coupled to a $CH_2$ group is equal to R; and P stands for phenyl, or unsubstituted or hydroxy-substituted $C_{1-6}$ alkyl or $C_{2-6}$ alkenyl; with the proviso that at least one of R is $C_{1-4}$ alkyl.

16. The method according to claim 15 wherein the predetermined temperature is lower than 130° C.

17. The method according to claim 15, wherein the coating includes:
   20-89.5% by weight of the compound having at least one epoxide group,
   0.5-30% by weight of the polyamine, and
   10-50% by weight of the co-curing agent.

18. The method according to claim 15, wherein the coating is applied to a surface selected as one from the group of soft wood, hard wood, artificial wood, glass, aluminum, stainless steel, iron, plastic, concrete, stone, a painted surface, natural fibers, and synthetic fibers.

* * * * *